United States Patent
Fan et al.

(10) Patent No.: US 8,401,232 B2
(45) Date of Patent: Mar. 19, 2013

(54) METHOD, DEVICE, AND COMPUTER-READABLE MEDIUM OF OBJECT DETECTION

(75) Inventors: Shengyin Fan, Beijing (CN); Hong Yi, Beijing (CN); Yu Deng, Beijing (CN); Xin Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 163 days.

(21) Appl. No.: 13/095,128

(22) Filed: Apr. 27, 2011

(65) Prior Publication Data
US 2011/0274315 A1 Nov. 10, 2011

(30) Foreign Application Priority Data
May 7, 2010 (CN) .......................... 2010 1 0165233

(51) Int. Cl.
*G06K 9/00* (2006.01)
(52) U.S. Cl. ........ 382/103; 348/354; 348/169; 600/458; 600/407
(58) Field of Classification Search .................. 382/103; 600/458, 407; 348/354, 169
See application file for complete search history.

(56) References Cited

U.S. PATENT DOCUMENTS

| | | | |
|---|---|---|---|
| 6,088,611 A * | 7/2000 | Lauterbur et al. ............. | 600/407 |
| 6,639,998 B1 | 10/2003 | Lee et al. | |
| 6,700,618 B1 * | 3/2004 | Chubachi ....................... | 348/354 |
| 2007/0195993 A1 * | 8/2007 | Chen et al. ..................... | 382/103 |
| 2008/0008360 A1 | 1/2008 | Pattikonda | |
| 2009/0213222 A1 * | 8/2009 | Baba et al. ..................... | 348/169 |
| 2009/0220123 A1 * | 9/2009 | Tojo et al. ..................... | 382/103 |
| 2009/0279737 A1 * | 11/2009 | Strens ........................... | 382/103 |
| 2009/0304230 A1 * | 12/2009 | Krahnstoever et al. ........ | 382/103 |
| 2010/0128927 A1 * | 5/2010 | Ikenoue ......................... | 382/103 |
| 2011/0058708 A1 * | 3/2011 | Ikenoue ......................... | 382/103 |
| 2011/0077524 A1 * | 3/2011 | Oshiki et al. .................. | 600/458 |
| 2011/0116682 A1 * | 5/2011 | Wang et al. .................... | 382/103 |

FOREIGN PATENT DOCUMENTS
WO WO 2007/092904 A2 8/2007

* cited by examiner

*Primary Examiner* — Stephen R Koziol
*Assistant Examiner* — Shaghayegh Azima
(74) *Attorney, Agent, or Firm* — Oblon, Spivak, McClelland, Maier & Neustadt, L.L.P.

(57) ABSTRACT

Disclosed are an object detection method and an object detection device. The object detection method comprises a step of obtaining plural detection results of a current frame according to plural object detection methods; a step of setting initial probabilities of the plural detection results of the current frame; a step of calculating a movement frequency distribution diagram representing movement frequencies of respective pixels in the current frame; a step of obtaining detection results of a previous frame; a step of updating the probabilities of the plural detection results of the current frame; and a step of determining a final list of detected objects based on the updated probabilities of the plural detection results of the current frame.

11 Claims, 11 Drawing Sheets

METHOD, DEVICE, AND COMPUTER-READABLE MEDIUM OF OBJECT DETECTION

BACKGROUND OF THE INVENTION

1. Field of the Invention

The present invention relates to image and video processing, particularly relates to an object detection method, an object detection device, and an object detection computer-readable medium for detecting one or more specific objects in a video.

2. Description of the Related Art

Accurate object detection techniques such as human face detection techniques, etc., are the foundations of various video application systems, for example, video conference systems, intelligent transportation systems, and multimedia monitoring systems.

When human detection among object detection is taken as an example, various human detection techniques, for example, a human face detection technique, a skin color detection technique, a human head detection technique, a moving object detection technique, and an upper body detection technique have been developed up to now. However, with regard to actual application scenes such as a video conference room, an office, a convenience store, an outdoor scene, etc., it is difficult to obtain a high accuracy of detection if only one detection technique is utilized. In general, as for human face detection, lighting conditions and human face angles influence a detection accuracy very much; as for skin color detection, lighting circumstances and color distributions of complicated environments influence a detection accuracy very much; and as for moving object detection, problems of shadows, obstruction, sticking, etc., influence a detection accuracy very much. As a result, a human face detection method based on multiple modes starts to garner attention.

For example, U.S. Pat. No. 6,639,998 B1 discloses a method of detecting a specific object in an image; US Patent Application Publication NO. 2008/0008360 A1 discloses a method and a system for counting the number of persons in a specific area of an image; and International Publication No. WO 2007/092904 A2 discloses a method of dividing a region-of-interest video object.

SUMMARY OF THE INVENTION

A method, a device, and a computer-readable medium for detecting one or more specific objects in a video are provided in the present invention.

According to one aspect of the present invention, an object detection method of detecting one or more predetermined objects in a video is provided. The object detection method comprises a step of obtaining plural kinds of detection results acquired by detecting the entireties or parts of the predetermined objects in a current frame according to plural kinds of object detection methods; a step of setting, based on predetermined detection accuracies corresponding to the plural kinds of object detection methods, initial probabilities of the plural kinds of detection results of the current frame corresponding to the plural kinds of object detection methods; a step of calculating, based on detection results of one or more moving objects in plural frames including the current frame, a movement frequency distribution diagram representing movement frequencies of respective pixels in the current frame; a step of filtering objects detected in a previous frame of the current frame based on the movement frequency distribution diagram so as to obtain filtered detection results of the previous frame; a step of updating, based on overlaps of the plural kinds of detection results of the current frame and the filtered detection results of the previous frame, the probabilities of the plural kinds of detection results of the current frame corresponding to the plural kinds of object detection methods; and a step of determining a final list of detected objects based on the updated probabilities of the plural kinds of detection results of the current frame.

According to another aspect of the present invention, an object detection device for detecting one or more predetermined objects in a video is provided. The object detection device comprises a detection result obtaining unit for obtaining plural kinds of detection results acquired by detecting the entireties or parts of the predetermined objects in a current frame according to plural kinds of object detection methods; an initial probability setting unit for setting, based on predetermined detection accuracies corresponding to the plural kinds of object detection methods, initial probabilities of the plural kinds of detection results of the current frame corresponding to the plural kinds of object detection methods; a movement frequency distribution diagram calculating unit for calculating, based on detection results of one or more moving objects in plural frames including the current frame, a movement frequency distribution diagram representing movement frequencies of respective pixels in the current frame; a previous detection result filtering unit for filtering objects detected in a previous frame of the current frame based on the movement frequency distribution diagram so as to obtain filtered detection results of the previous frame; a probability updating unit for updating, based on overlaps of the plural kinds of detection results of the current frame and the filtered detection results of the previous frame, the probabilities of the plural kinds of detection results of the current frame corresponding to the plural kinds of object detection methods; and an object list determining unit for determining a final list of detected objects based on the updated probabilities of the plural kinds of detection results of the current frame.

According to still another aspect of the present invention, a non-transitory computer-readable medium is provided. The non-transitory computer-readable medium has machine-executable instructions for execution by a processing system. The machine-executable instructions are used for carrying out an object detection method of detecting one or more predetermined objects in a video, and the machine-executable instructions, when executed, cause the processing system to carry out a step of obtaining plural kinds of detection results acquired by detecting the entireties or parts of the predetermined objects in a current frame according to plural kinds of object detection methods; a step of setting, based on predetermined detection accuracies corresponding to the plural kinds of object detection methods, initial probabilities of the plural kinds of detection results of the current frame corresponding to the plural kinds of object detection methods; a step of calculating, based on detection results of one or more moving objects in plural frames including the current frame, a movement frequency distribution diagram representing movement frequencies of respective pixels in the current frame; a step of filtering objects detected in a previous frame of the current frame based on the movement frequency distribution diagram so as to obtain filtered detection results of the previous frame; a step of updating, based on overlaps of the plural kinds of detection results of the current frame and the filtered detection results of the previous frame, the probabilities of the plural kinds of detection results of the current frame corresponding to the plural kinds of object detection methods; and a step of determining a final list of detected objects based on the updated probabilities of the plural kinds of detection results of the current frame.

In the object detection method and the object detection device, since a possibility of detection correctness is represented by the probabilities, and the probabilities are updated based on overlaps of the plural kinds of detection results obtained by carrying out the plural detection methods, the object detection method and the object detection device have a stronger flexibility, and more comprehensively take into account the plural kinds of detection results; as a result, it is possible to improve the detection accuracy and reduce the detection error rate.

DETAILED DESCRIPTION OF THE PREFERRED EMBODIMENTS

Hereinafter, various embodiments of the present invention will be concretely described with reference to the drawings. Here it should be noted that the same symbols, which are in the specification and the drawings, stand for constructional elements having the same or basically-same function and structure, and repeated explanations for the constructional elements are omitted in the specification.

Before describing the embodiments of the present invention in detail, in order to easily understand the present invention, first the thinking of the present invention is briefly introduced as follows. Different from conventional techniques, plural kinds of detection results are not determined by using a categorically-denying or wholeheartedly-accepting approach in the present invention; in other words, a probability concept is introduced to represent correctness of the plural kinds of detection results in the present invention. Furthermore, as for a video, historical detection results, for example, detection results obtained by carrying out detection with regard to a historical frame 0.1 seconds ago, may provide help information to current frame detection. As a result, by taking into account overlaps of the plural kinds of detection results of the current frame and the plural kinds of detection results of the historical frame, with regard to overlapped detection results, it is necessary to increase probabilities of the overlapped detection results of the current frame. After probabilities of the plural kinds of detection results of the current frame are obtained, a final list of detected objects is determined. In addition, when using the plural kinds of detection results of the historical frame, it is not using the detected objects without distinguishing them. In other words, an overall movement frequency of an object region at a time point is taken into account; for example, if an average movement frequency in an object region is very high, then the existence of the detected object from this object region in the historical frame may not be helpful to verify the detection results of the current frame. As a result, this kind of detection result of the historical frame should be removed from the detection results of the historical frame.

In what follows, in order to describe easily, a human being is taken as an example of a detection object. However, it should be noted that the human being is just an example; in other words, any movable object may be taken as the detection object in the embodiments of the present invention.

Figure 1:
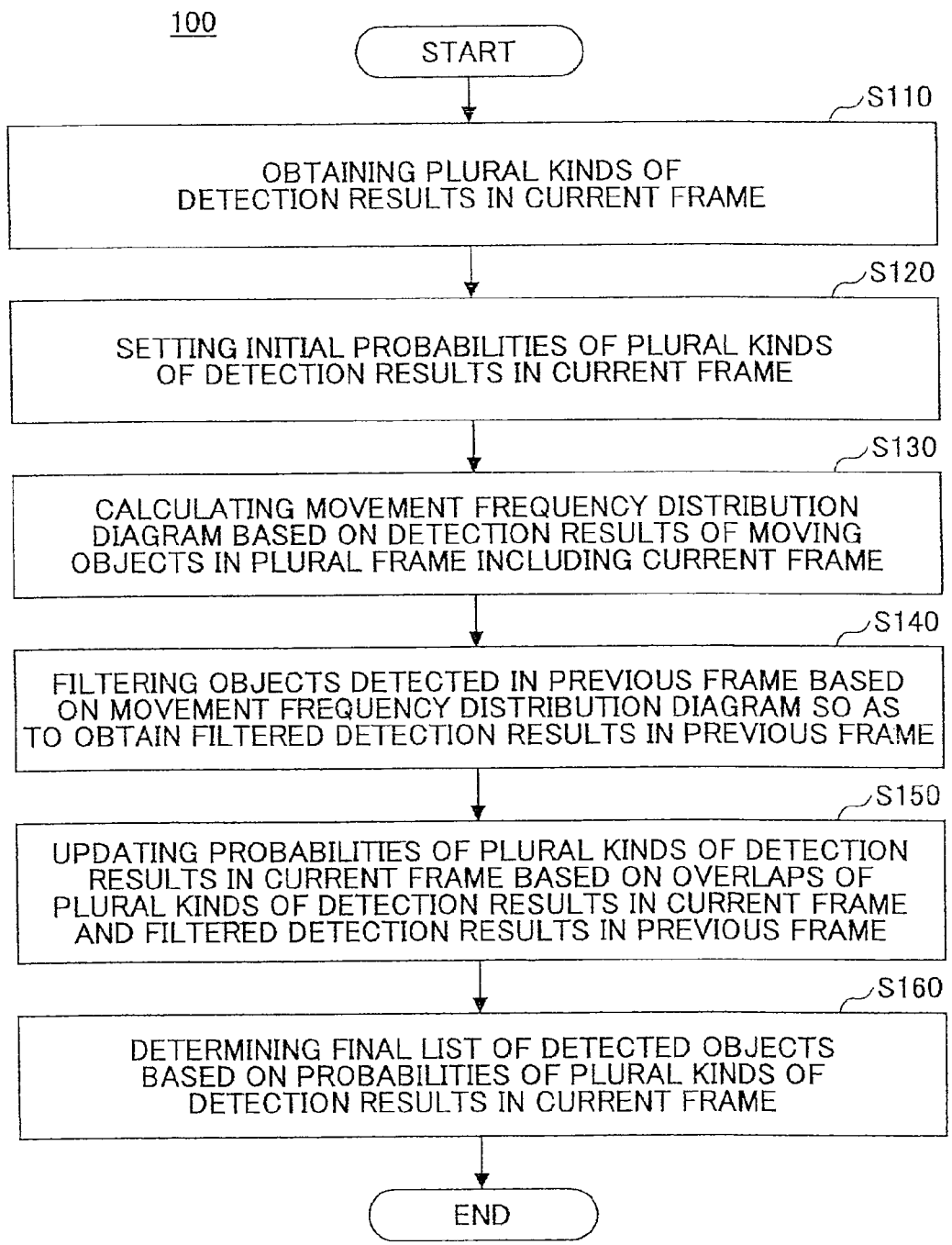
FIG. 1 is a flowchart of an object detection method according to an embodiment of the present invention.

FIG. 1 is a flowchart of an object detection method 100 according to an embodiment in the present invention.

As shown in FIG. 1, the object detection method 100 includes a detection result obtaining step S110, an initial probability setting step S120, a movement frequency distribution diagram calculating step S130, a previous frame detection result filtering step S140, a probability updating step S150, and a final object list determining step S160. The respective steps are illustrated as follows.

In STEP S110 of FIG. 1, plural kinds of detection results obtained by detecting, based on plural kinds of detection methods, the entireties or portions of one or more predetermined specific objects in a current frame are acquired.

The plural kinds of detection methods may be divided into moving object detection methods and other object detection methods according to carrying out the detection based on a multi-frame moving object or a single-frame static image.

In general, moving object detection refers to extracting moving objects from a segment of a video. Well-used moving object detection methods include a background difference method, a neighbor frame difference method, and an optical flow method, and these methods are well-known techniques in the art. The key of the background difference method is creating an accurate background model and timely updating the background model as scenes vary. When creating the background model, a background model creation method based on statistics calculation may relatively accurately simulate a real scene, and extract a nearly entire moving object. As for the neighbor frame difference method, its real time is good, and it has strong robustness with regard to dynamic scenes; however, it is not suitable for detecting objects moving slowly. The optical flow method may realize detection and tracking of moving objects without any prior knowledge on a background region; however, it is relatively sensitive to noise. It is possible to select a proper moving object detection method based on an actual demand. In addition, a background model creating method based on plural mixed Gaussians may not only detect moving objects but also partially detect temporarily static objects.

The other detection methods refer to any other object detection methods whose processing objects are single-frame images, aside from the above described moving object detection methods. For example, in a case where plural kinds of human detection methods are taken as examples, according to parts of a human body, the human detection may be divided into human face detection, human head detection, upper body detection, whole body detection, etc., and according to particularly adopted methods, the human detection methods may be divided into a feature space detection method, a neural network detection method, an AdaBoost detection method, a decision tree detection method, etc. These detections, detection methods, and their combination, for example, a feature space detection method of a human face, an AdaBoost detection method of a human face, a decision tree detection method of a human face, a feature space detection method of a human head, an AdaBoost detection method of a human head, a decision tree detection method of a human head, etc., may be used as the other detection methods in the embodiments of the present invention.

Object detection results are represented as a list of the entireties or parts of one or more specific objects detected from a current frame. The entireties or the parts of the specific objects may be represented by minimum rectangular regions including the entireties or the parts of the specific objects; in particular, for example, it is possible to use coordinates of the top-left corner point and the bottom-right corner point of a rectangular region to present the entirety or a part of a specific object. For example, as for a human face, it is possible to utilize coordinates of the top-left corner point and the bottom-right corner point of a rectangle surrounding the human face to represent the entirety of the human face. Of course, it is also possible to use another shape such as an ellipse or a circle to represent the entirety of the human face. For example, if three persons are detected from an image, then it is possible to use a list like $\{(x_{1L}, y_{1L}; x_{1R}, y_{1R}), (x_{2L}, y_{2L}; x_{2R}, y_{2R}), (x_{3L}, y_{3L}; x_{3R}, y_{3R})\}$ to represent such kinds of detection results.

In STEP S120 of FIG. 1, according to predetermined detection accuracies of the plural kinds of detection methods, initial probabilities of the plural kinds of detection results corresponding to the plural kinds of detection methods are set.

A detection accuracy of a detection method may be defined as, for example, $$ROD = \frac{H}{H+F};$$

here ROD refers to the detection accuracy, H refers to the number of correct detection results, and F refers to the number of wrong detection results. In addition, the detection accuracy may also be defined as a detection ratio. The detection ratio refers to a ratio of the number of correctly detected objects to the number of all objects. An initial probability of a detection result represents a possibility of correctness of the detection result; for example, if an initial probability of a human head detection method is expressed as P(human|human head), that stands for a possibility of an object surely being a human being in a case where a human head is detected.

Here it should be noted that the predetermined detection accuracies of the plural kinds of detection methods may be obtained by statistics calculation and stored in a knowledge database in advance; however, it may also be acquired by using self-adaptive learning or set based on experience. In later discussion, a method of creating a knowledge database will be described by reference to FIG. 3. Furthermore, in later discussion, a method of how to set initial probabilities of the plural kinds of detection results of the plural kinds of detection methods by utilizing the created knowledge database will be described by reference to FIG. 4.

In STEP S130 of FIG. 1, a movement frequency distribution diagram is calculated based on detection results of at least one multi-frame (including the current frame) moving object; the movement frequency distribution diagram represents movement frequencies of respective pixels in the current frame (i.e. the current image).

Here it should be noted that the detection results of the multi-frame moving object may be obtained by utilizing any moving object detection methods that may be independent from various detection methods related to the respective detection results involved in the above described STEPS S110 and S120, or may be a part of the above described various detection methods. In later discussion, a method of how to calculate the movement frequency distribution diagram will be described by reference to FIG. 6.

In STEP S140 of FIG. 1, specific objects detected from a previous frame are filtered based on the movement frequency distribution diagram obtained in STEP S130 so that the filtered detection results of the previous frame are obtained. In later discussion, a method of how to filter the detection results of the previous frame by utilizing the movement frequency distribution diagram will be described by reference to FIG. 7.

In STEP S150 of FIG. 1, the probabilities of the respective detection results of the current frame are updated based on overlaps of the respective detection results of the current frame and the filtered detection results of the previous frame. In later discussion, an example of how to concretely carry out this step will be described by reference to FIG. 8.

In STEP S160 of FIG. 1, a final list of detected objects is determined based on the probabilities of the respective detection results. In later discussion, an example of how to concretely carry out this step will be described by reference to FIG. 9. The final object detection results (i.e. the final list of detected objects) may be shown on a display or stored in a memory, and also be stored in a previous frame detection result database to serve as new previous frame detection results.

In addition, a step of removing an object causing noise in the final object list based on a predetermined noise removing rule defined according to an actual application may be included too. The predetermined noise removing rule refers to a rule of removing noise defined according to an actual application. For example, in a case of human detection, in a video conference scene, since the probability of a person occurring in the bottom region of a video image is very small, it is possible to design a rule by which a detection result in the bottom region of the video image may be removed; for example, a detected person under a chair may be removed. It is apparent that the predetermined rule may be similarly applied to various detection results, for example, the respective detection results in STEP S110.

Figure 2:
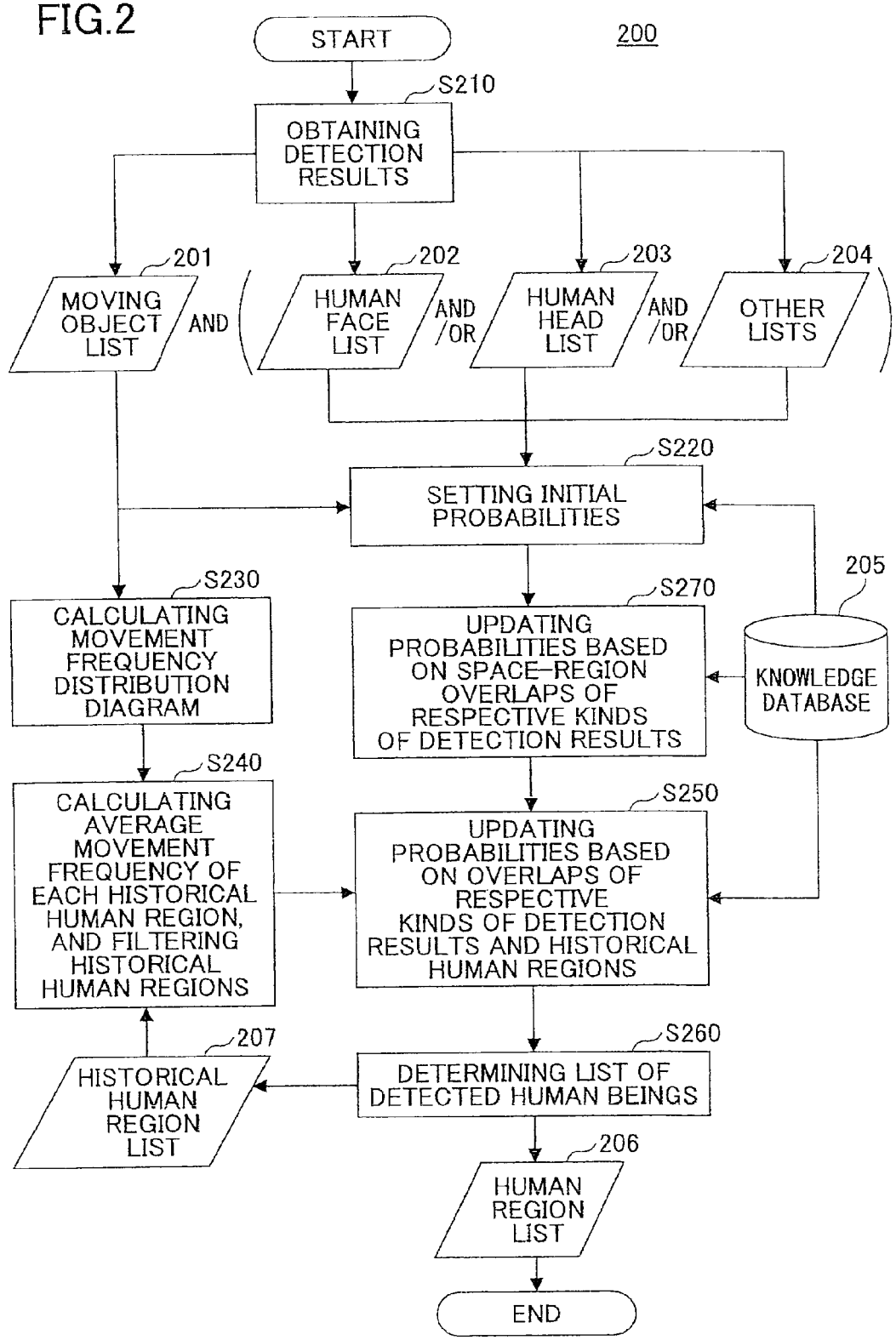
FIG. 2 is a flowchart of a human detection method according to an embodiment of the present invention.

FIG. 2 is a flowchart of a human detection method 200 according to another embodiment of the present invention.

In FIG. 2, in order to understand the human detection method 200, respective steps and data related to some steps are illustrated. The data includes a moving object list 201, a human face list 202, a human head list 203, and other lists 204; these lists serve as respective detection results. The data further includes a knowledge database 205, a human region list 206, and a historical human region list 207. The knowledge database 205 is used for setting probabilities and updating the probabilities. The human region list 206 serves as a final result. The historical human region list 207 is used for follow-on detection.

STEPS S210, S220, S230, S240, S250, and S260 in the human detection method 200 are similar to STEPS S110, S120, S130, S140, S150, and S160 in the object detection method 100 shown in FIG. 1. The only difference between STEPS S210~S260 in the human detection method 200 and STEPS S110~S160 in the object detection method 100 is that in the human detection method 200 shown in FIG. 2, the detection object is a human being; as a result, descriptions of STEPS S210~S260 in the human detection method 200 are omitted here.

A difference between the human detection method 200 and the object detection method 100 is that in the human detection method 200, STEP S270 is added. In STEP S270, the probabilities of the respective detection results are updated according to overlaps of the respective detection results of a current frame. For example, as for a current frame (i.e. a current image), if a human face a in the human face list 202 overlaps with a human head b in the human head list 203, then that implies that a possibility of a human being existing is very high; as a result, the correctness probability of the human a in the human face list 202 and the correctness probability of the human head b in the human head list 203 should be increased. In later discussion, STEP S270 will be concretely described.

Here it should be noted that in FIG. 2, STEP S270 is located before STEP S250 where the overlap processing of the current frame detection and the historical frame detection is carried out. However, STEP S270 is not always located before STEP 250; in other words, STEP S270 may also be located after STEP S250.

The human detection method 200 shown in FIG. 2 takes into account not only the overlaps of the respective detection results of the current frame and the respective detection results of the historical frame (in what follows, these kinds of overlaps sometimes are called "time-region overlaps") but also the overlaps of the respective detection results of the current frame themselves (in what follows, these kinds of overlaps sometimes are called "space-region overlaps") in order to update the probabilities of the respective detection results of the current frame. Therefore it is possible to improve the accuracy of the human detection method 200.

Figure 3:
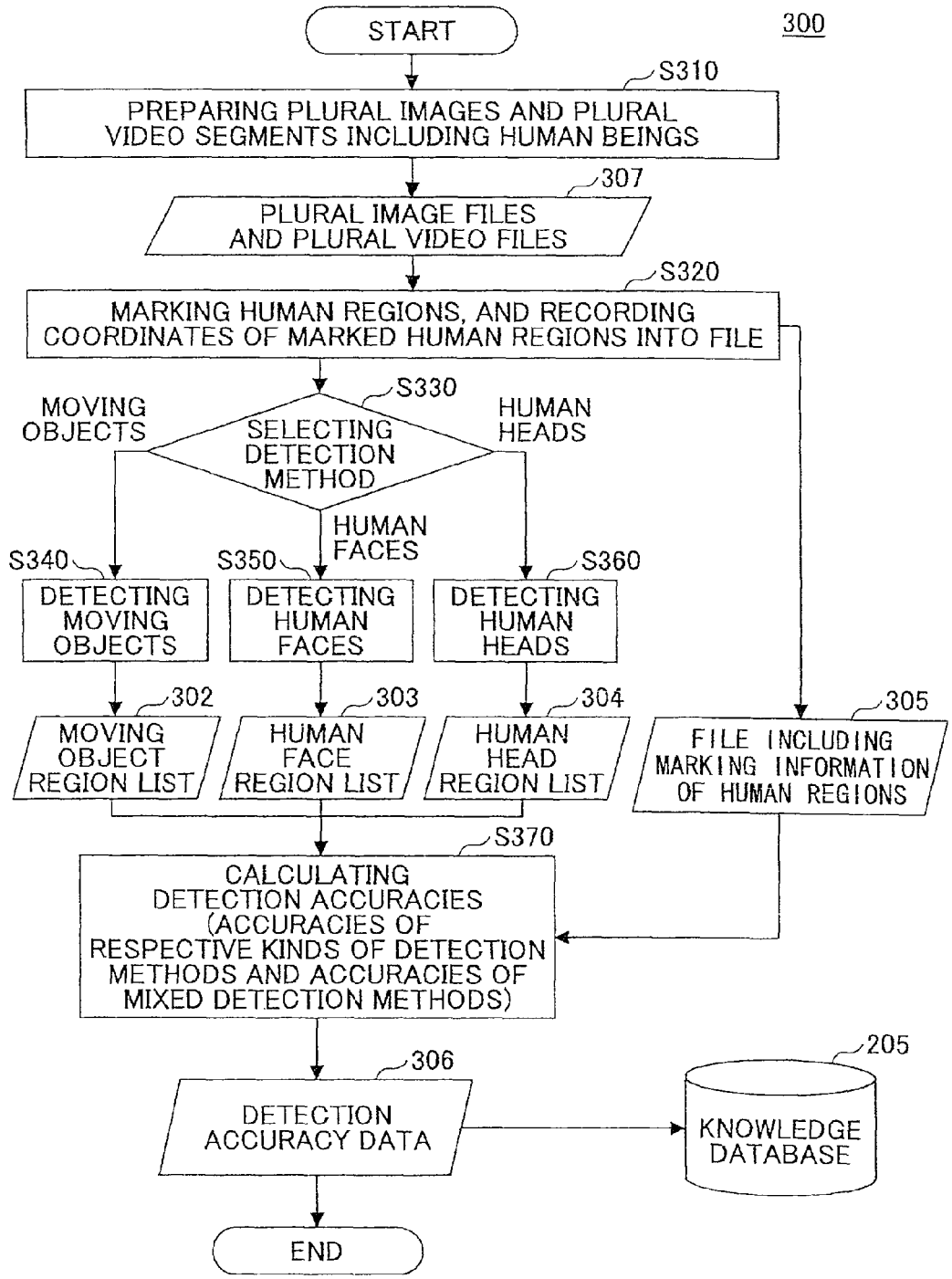
FIG. 3 is a flowchart of a method of creating a knowledge database based on statistics calculation, according to an embodiment of the present invention.

In what follows, a creation method of a knowledge database storing respective detection accuracies of various detection methods and detection accuracies when the detection results of the various detection method overlap (in what follows, the latter detection accuracies sometimes are called "mixed detection accuracies") is described according to FIG. 3 by taking the human detection as an example again.

FIG. 3 is a flowchart of a method 300 of creating a knowledge database based on statistics calculation, according to an embodiment of the present invention.

In STEP S310, plural images and plural video segments including at least one human being are prepared.

In STEP S320, human regions are marked by hand, and coordinates of the marked human regions are stored into a file. By carrying out this step, positions and the number of the human beings in the images and the video segments are obtained.

In STEP S330, human detection methods such as a moving object detection method, a human face detection method, a human head detection method, an upper body detection method, a whole body detection method, a skin color detection method, etc., are selected. In this embodiment, it is supposed that the moving object detection method, the human head detection method, and the human face detection method are selected. In STEP S340, moving and temporarily static human beings are detected by using the moving object detection method. In STEP S350, human faces are detected by using the human face detection method. In STEP S360, human heads are detected by using the human head detection method. Here it should be noted that those skilled in the art may understand that the number of the selected detection methods is not limited to 3, and the selected detection methods are not limited to the moving object detection method, the human head detection method, and the human face detection method; that is, any human detection methods may be applied to the embodiments of the present invention.

In STEP S370, detection accuracies of the respective detection methods are calculated by using the file including human region information, obtained in STEP S320 and detection results of the respective detection methods.

For example, a method of calculating a detection accuracy of human face detection by taking the human face detection as an example is described here. A current detection method is the human face detection method, and the detection result includes human faces. By verifying whether the detected human face regions overlap with the marked human regions, it is possible to calculate the number of the correctly detected human faces and the number of the wrongly detected human faces; at the same time, it is possible to calculate the number of human beings who are not detected. Based on the number of the correctly detected human faces, the number of the wrongly detected human faces, the number of the human beings who are not detected, and the number of all the marked human beings, it is possible to calculate the detection accuracy of the human face detection. Furthermore whether the detected human face regions overlap with the marked human regions may be determined by the areas of the overlapped regions. For example, first an area value Area of a region that is smaller in area is selected from a detected human face region and a marked human region that overlaps. Then an overlap ratio r of the overlap region area to the area value Area is calculated. If r is greater than a predetermined threshold value, then the detected human face region may be determined as a correctly detected human face. The predetermined threshold value may be a range of, for example, 0.6 to 1.0, and its concrete value may be obtained from experiment or experience, or randomly selected from the range.

Aside from calculating the detection accuracy of an individual detection method by using the statistics calculation, STEP S370 also calculates, based on the above described calculation method, mixed-detection accuracies of some detection methods such as a mixed-detection accuracy of the human face detection method and the human head detection method, a mixed-detection accuracies of the human face detection method and the upper body detection method, etc. In particular, for example, as for the mixed-detection accuracy of the human face detection method and the human head detection method, it may be calculated as follows. First a human face list of the human face detection method and a human head list of the human head detection are obtained. Second, by determining overlaps of these two lists, a head-and-face region list including head-and-face regions that are determined as both human faces and human heads is obtained. Third the number of correctly detected head-and-face regions, the number of wrongly detected head-and-face regions, the number of head-and-face regions that are not detected, and the number of all the marked head-and-face regions in the head-and-face region list are obtained. Fourth the mixed-detection accuracy of the human face detection method and the human head detection method is obtained by dividing the number of the correctly detected head-and-face regions in the head-and-face region list by the sum of the number of the correctly detected head-and-face region and the number of wrongly detected head-and-face regions in the head-and-face region list.

Furthermore STEP 370 similarly calculates detection accuracies of time-space-region mixing detection methods, for example, a time-region-mixing detection accuracy of a human face detection result and a time-region historical detection result and a time-region-mixing detection accuracy of a human head detection result and a time-region historical detection result. A time-region-mixing detection method refers to a human region detection method by combining detection results of a space-region detection method (for example, the human head detection method and the upper body detection method) and time-region historical detection results (i.e. time-region historical human regions). Finally the detection accuracy data of all the individual detection methods, the mixed-detection methods, and the time-region-mixing detection methods are stored into the knowledge database 205.

Figure 4:
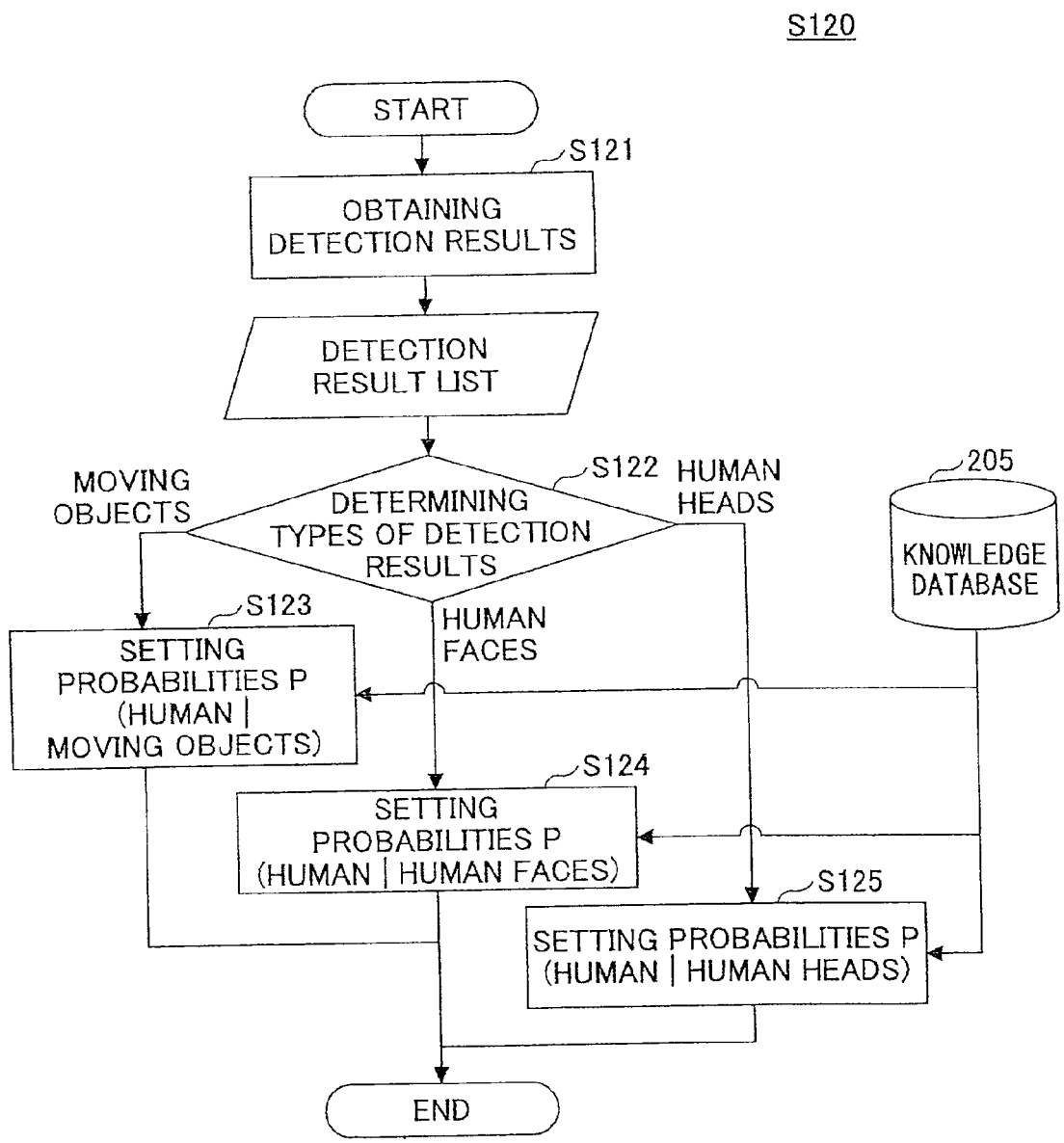
FIG. 4 is a flowchart of a method of setting initial probabilities of plural kinds of detection results based on a knowledge database, according to an embodiment of the present invention.

FIG. 4 is a flowchart of a method of setting initial probabilities of plural kinds of detection results based on a knowledge database, able to be used in STEP S120 of FIG. 1 according to an embodiment of the present invention.

In STEP S121, one or more detection results related to human detection are arbitrarily obtained. In STEP S122, types of the detection results are determined. In STEPS S123, S124, and S125, based on the types of the detection results, corresponding detection accuracies are obtained from the knowledge database 205, and initial probabilities of the detection results are set. For example, in a case where detection results are moving object detection results, in STEP S123, a detection accuracy corresponding to a moving object detection method is obtained from the knowledge database 205, and initial probabilities P(humans|moving objects) of all the moving object detection results are set as the value of the detection accuracy.

In a case where detection results are human face detection results, in STEP S124, a detection accuracy corresponding to a human face detection method is obtained from the knowledge database 205, and initial probabilities P(humans|human faces) of all the human face detection results are set as the value of the detection accuracy. In a case where detection results are human head detection results, in STEP S125, a detection accuracy corresponding to a human head detection method is obtained from the knowledge database 205, and initial probabilities P(humans|human heads) of all the human head detection results are set as the value of the detection accuracy.

Here it should be noted that in FIG. 4, setting of the initial probabilities is described by taking the moving object detection results, the human face detection results, and the human head detection results as examples. However, the present invention is not limited to these; in other words, it is possible to set initial probabilities of any detection results of detection methods as long as detection accuracies corresponding to the detection methods are stored in the knowledge database 205 in advance.

Figure 5:
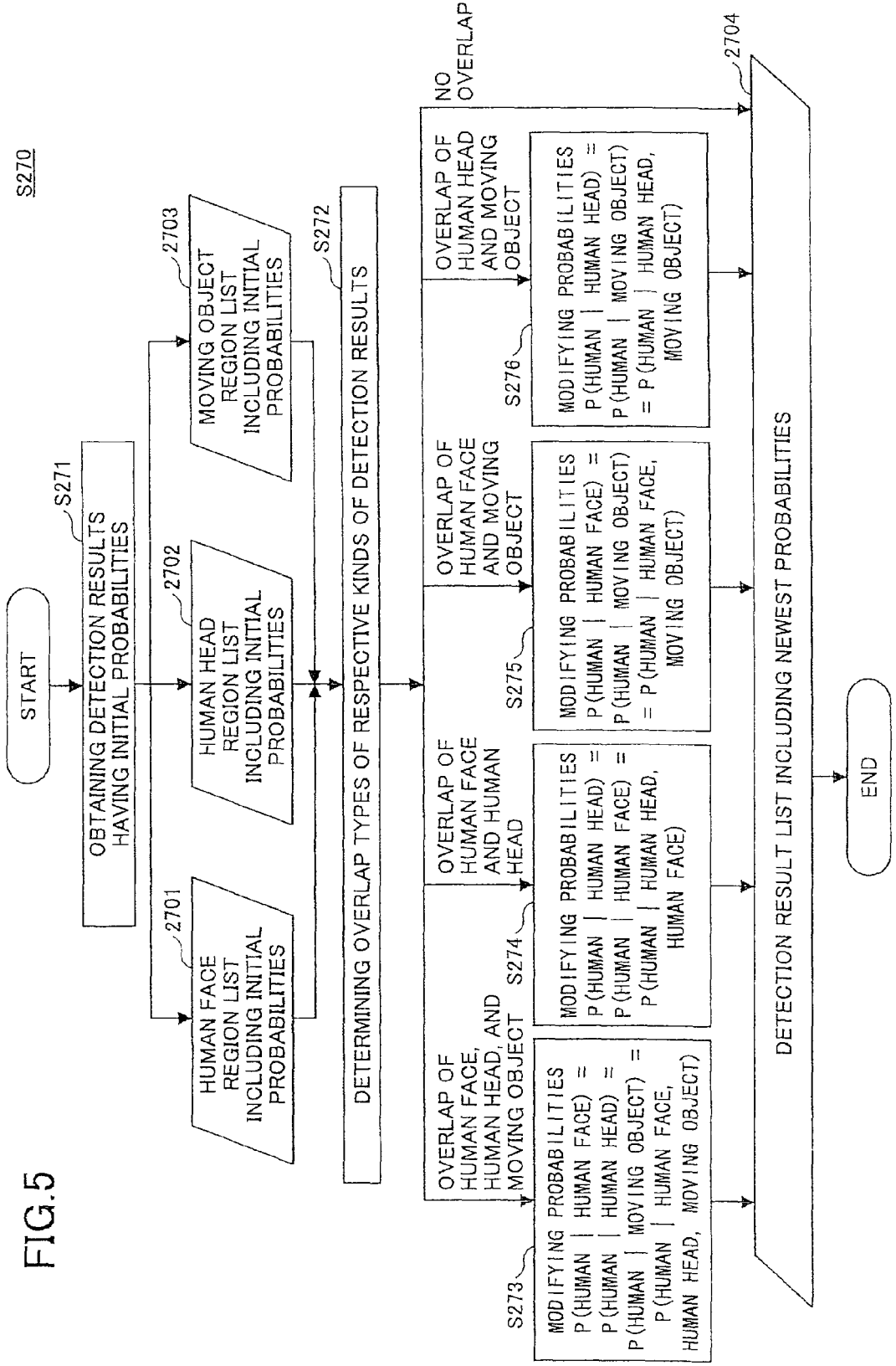
FIG. 5 is a flowchart of a method of updating probabilities of plural kinds of detection results based on overlaps of the plural kinds of detection results in a space region, according to an embodiment of the present invention.

In what follows, the processing of space-region overlaps in STEP S270 of FIG. 2 is concretely illustrated by referring to FIG. 5.

FIG. 5 is a flowchart of a method of updating probabilities of detection results based on overlaps of the detection results in a space region, according to an embodiment of the present invention.

In STEP S271, detection results including initial probabilities, for example, a human face region list 2701 where initial probabilities are set, a human head region list 2702 where initial probabilities are set, and a moving object region list 2703 where initial probabilities are set, are obtained.

In STEP S272, types of overlaps of the respective detection results are determined.

For example, if in STEP S272 it is determined that a human face region serving as a human face detection result, a human head region serving as a human head detection result, and a moving object region serving as a moving object detection result overlaps, then in STEP S272 a probability of the overlapped human face, human head, and moving object detection result is modified by using an accuracy of a mixed-detection method based on a human face detection method, a human head detection method, and a moving object detection method (for example, the accuracy may be obtained from the knowledge database 205). For example, the modification may be carried out by using the following equation: P(human|human face)=P(human|human head)=P(human|moving object)=P(human|human face, human head, moving object).

If in STEP S272 it is determined that a human face region serving as a human face detection result and a human head region serving as a human head detection result overlaps, then in STEP S274 a probability of the overlapped human face and human head detection result is modified by using an accuracy of a mixed-detection method based on a human face detection method and a human head detection method (for example, the accuracy may be obtained from the knowledge database 205). For example, the modification may be carried out by using the following equation: P(human|human face)=P(human|human head)=P(human|human face, human head).

If in STEP 272 it is determined that a human face region serving as a human face detection result and a moving object region serving as a moving object detection result overlaps, then in STEP S275 a probability of the overlapped human face and moving object detection result is modified by using an accuracy of a mixed-detection method based on a human face detection method and a moving object detection method (for example, the accuracy may be obtained from the knowledge database 205). For example, the modification may be carried out by using the following equation: P(human|human face)=P(human|moving object)=P(human|human face, moving object).

If in STEP 272 it is determined that a human head region serving as a human head detection result and a moving object region serving as a moving object detection result overlaps, then in STEP S276 a probability of the overlapped human head and moving object detection result is modified by using an accuracy of a mixed-detection method based on a human head detection method and a moving object detection method (for example, the accuracy may be obtained from the knowledge database 205). For example, the modification may be carried out by using the following equation: P(human|human head)=P(human|moving object)=P(human|human head, moving object).

If in STEP S272 it is determined that a human face region serving as a human face detection result, a human head region serving as a human head detection result, and a moving object region serving as a moving object detection result do not overlap, and any two regions of the three regions do not overlap too, then an operation of modifying a probability is not carried out.

After the types of overlaps are determined, and the corresponding operations are carried out based on the determined results, a detection result list 2704 including newest probability values is obtained. Then the processing in STEP S270 of FIG. 2 ends.

Here it should be noted that in the above description, in a case where the respective detection results do not overlap, the probabilities of the detection results are kept unchanged. Instead, in this case, the probabilities of the detection results may be decreased. That is, it is considered that the detection results (i.e. the regions) should overlap; if they do not overlap, then a penalty is adopted, i.e., the probabilities of the detection results are multiplied by 90%.

In addition, in the above description, in a case where two detection results overlaps, it is possible to simply use a space-region mixed-detection accuracy obtained from the knowledge database 205 to replace the probabilities of the two detection results. Instead it is also possible to update the two detection results by letting a ratio of the overlapped area be a weight. For example, if the overlapped area of a human head region and a human face region is 70% of the area of the human face region, then it is possible to update the probability of the human face region by using the following equation: P(human|human face)*(1−70%)+P(human|human head, human face)*70%.

Figure 6:
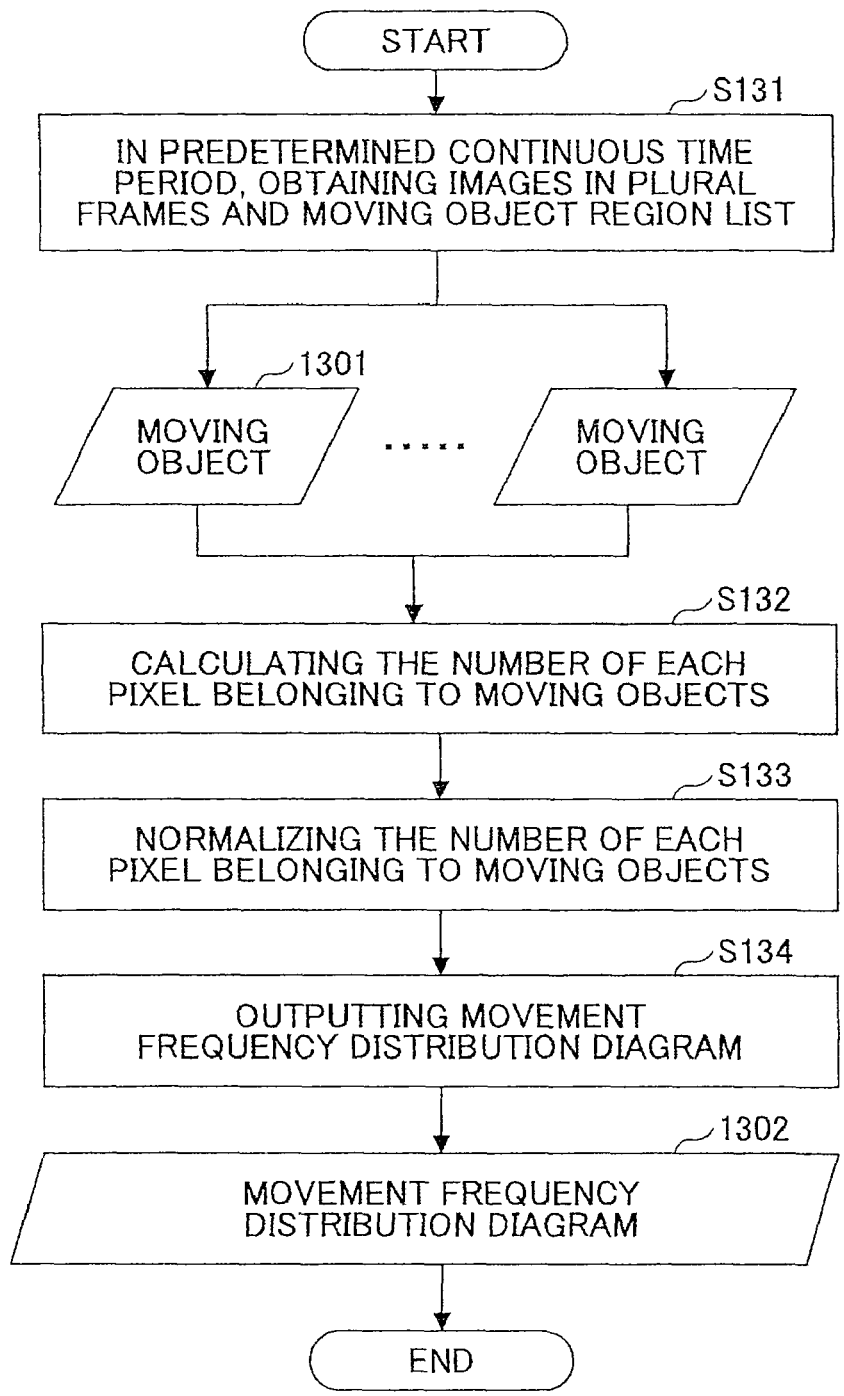
FIG. 6 is a flowchart of a method of calculating a movement frequency distribution diagram of a current frame based on moving object detection results, according to an embodiment of the present invention.

In what follows, the processing in STEP S130 of FIG. 1 is described by referring to FIG. 6; that is, how to calculate the movement frequency distribution diagram of the current frame based on the detection results of one or more multi-frame (including the current frame) moving objects is described. The movement frequency distribution diagram represents movement frequencies of respective pixels in the current image (i.e. the current frame), i.e., represents trend of movement intensity of the respective pixels in the current frame.

In STEP S131, detection results of moving objects in a predetermined continuous time period from a current time point to a previous time point are obtained; in this way, plural moving objects 1301 are obtained. The predetermined continuous time period may be 0.5 seconds, 1.0 seconds, 2 seconds, or other time period values.

In STEP S132, the numbers of times of respective pixels belonging to the moving objects are calculated by the following equations (1) and (2).

$$f_k(x, y) = \begin{cases} 0, & \text{pixel}(x, y) \in \text{others} \\ 1, & \text{pixel}(x, y) \in \text{foreground} \end{cases} \quad (1)$$

$$\text{times}(x, y) = \sum_{k=1}^{N(t)} f_k(x, y) \quad (2)$$

Here it should be noted that the number of the frames of a video segment in a predetermined continuous time period t changes dynamically since variations of computer environments are taken into account. N(t) is introduced to refer to the number of the frames in the predetermined continuous time period t; pixel(x,y) refers to a pixel whose coordinates are (x,y); pixel(x,y)∈foreground indicates that the pixel pixel(x, y) belongs to the moving objects (i.e. the so-called foreground); pixel(x,y)∈others indicates that the pixel pixel(x,y) belongs to other regions except the foreground, i.e., does not belong to the moving objects; and $f_k(x,y)$ indicates whether the pixel pixel(x,y) in the k-th frame belongs to the moving objects.

In STEP S133, normalization processing is carried out with regard to the number of times of each pixel belonging to the moving objects by using the following equation (3) so as to remove influence caused by dynamic variation of the video frames.

$$\text{Nor\_Timer}(x,y) = \text{times}(x,y)/N(t) \quad (3)$$

After the normalization processing, the value of Nor_Timer(x,y) is in a range of 0 to 1, and represents the movement frequency of the pixel pixel(x,y).

In STEP S134, a movement frequency distribution diagram 1302 of the current frame is output.

Here it should be noted that the above described calculation of the movement frequency distribution diagram is just an example. In other words, as long as a method by which the movement frequencies or the movement trends may be represented, the method may be used to calculate the movement frequency distribution diagram.

For example, in the above described calculation, the respective frames are given the same weights; however, it is possible to give high weights to the detection results of the moving objects in frames close to the current frame, and give low weights to the detection results of the moving objects in frames far from the current frame.

Again, for example, the movement frequency distribution diagram may also be calculated by using an optical flow method. The basic thinking of the optical flow method is as follows. In a apace, movements may be described by a movement filed, and in an image plane, movements of objects are usually represented by differences of distributions of gray levels of various images in an image sequence; as a result, when a movement filed in a space is transferred to images, the movement filed is represented as an optical flow field. An optical flow field reflects variation trends of grayscales of respective points in images, and may be considered as an instant speed filed generated when pixel points with grayscales move on image planes, and also may be considered as an approximate estimation carried out with regard to a real movement field. In a relatively ideal case, the optical flow method may calculate speeds of moving objects without knowing any information of a scene in advance. An optical flow represents variations of images; since the optical flow includes information of moving objects, it may be used by a user to determine moving circumstances of the moving objects. In particular, it is possible to adopt an optical flow calculation method based on gradients so as to obtain optical flow speed rate and normalized optical flow speed rate along a gradient direction of each pixel, and let the normalized optical flow speed rate represent the movement frequency Nor_Timer(x,y) of the pixel pixel(x,y).

Figure 7:
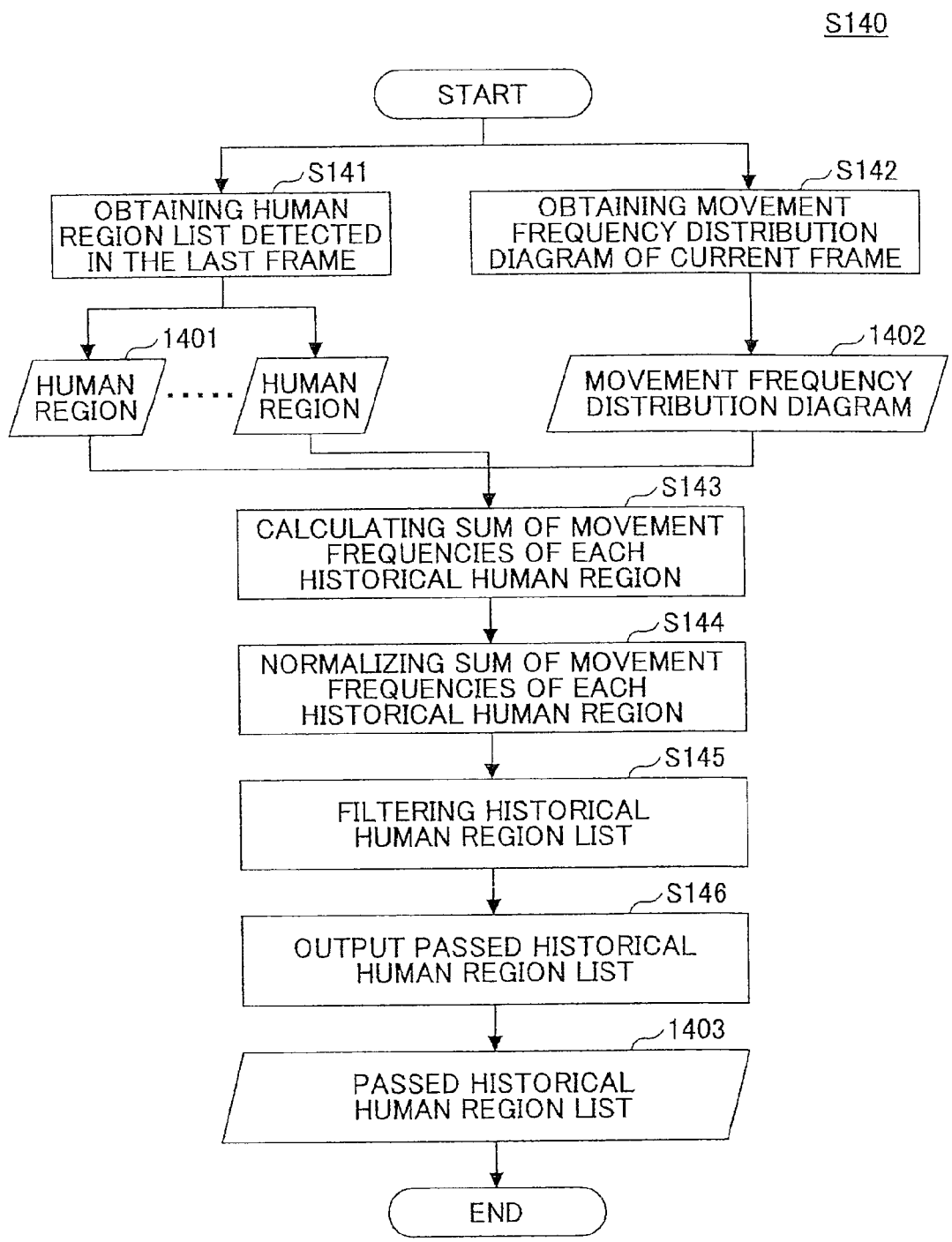
FIG. 7 is a flowchart of a method of filtering a historical person region list based on a movement frequency distribution diagram of a current frame, according to an embodiment of the present invention.

In what follows, by reference to FIG. 7, the processing of filtering the detection results of the previous frame in STEP S140 of FIG. 1 is described by taking human detection as an example. FIG. 7 is a flowchart of a method of filtering a historical human region list based on a movement frequency distribution diagram of a current frame, according to an embodiment of the present invention.

In order to easily understand the processing in STEP S140 of FIG. 1, first the thinking of filtering a historical human region is introduced as follows. If the sum of movement frequencies of a historical human region is small, that means the movement of the historical human region is not intensive, then it is predictable that in the next frame, i.e., in the current frame, there may exist a human being in the same region; as a result, the historical human region may be used to provide help information to detection results of the current frame. On the contrary, if the sum of the movement frequencies of the historical human region is big, that means the movement of the historical human region is intensive, then the historical human region of the previous frame is not able to provide help information to the detection results of the current frame.

In STEP S141, for example, the final detection results (i.e. a time-region historical human region list 1401) of the last frame of the current frame is obtained.

In STEP S142, a movement frequency distribution diagram 1402 of the current frame is obtained.

In STEP S143, the sum of movement frequencies of each time-region historical human region i is calculated by using the following equation (4).

$$\text{sum\_motion}(i) = \sum_{k=1}^{width(i) \times height(i)} \text{Nor\_Times}(x_k, y_k) \quad (4)$$

wherein, pixel($x_k,y_k$)∈region(i)

Here region(i) refers to the i-th historical human region; width(i) refers to the width of the i-th historical human region; height(i) refers to the height of the i-th historical human region; width(i)×height(i) refers to the number of the pixels in the i-th historical human region; Nor_Times($x_k,y_k$) refers to a current movement frequency of a pixel k; and Sum_motion(i) refers to the sum of movement frequencies in the i-th historical human region.

Since areas of the respective time-region historical human regions are various, in STEP S144, the sum of the movement frequencies in each of the time-region historical human regions is normalized by using the following equation (5).

$$\text{Nor\_Sum}(i) = \text{sum\_motion}(i)/(\text{width}(i) \times \text{height}(i)) \quad (5)$$

In STEP S145, the time-region historical detection results are filtered by using the normalized sum. In particular, if the normalized sum of time-region historical detection results is less than or equal to a predetermined threshold value, then this time-region historical detection result remains; otherwise this time-region historical detection result is removed.

A filtering equation is, for example, the following equation (6); threshold in the following equation (6) refers to a threshold value whose range is 0 to ½, and a concrete threshold value may be determined from experiment or experience, or may be randomly selected from the range of 0 to ½.

$$\text{pass}(i) = \begin{cases} 0, & \text{Nor\_Sum}(i) > \text{threshold} \\ 1, & \text{Nor\_Sum}(i) \leq \text{threshold} \end{cases} \quad (6)$$

If pass(i) is equal to 0, then that means a historical human region i cannot pass verification of movement frequency, and the historical human region i is removed from the historical human region list. If pass(i) is equal to 1, then that means the historical human region i remains in the historical human region list.

For example, if time-region historical detection results of the last frame forms a historical human region list {a historical human region 1, a historical human region 2, . . . , a historical human region i, . . . , a historical human region M}, that means that M human beings are detected. If it is supposed that the threshold value is ½, then in a case where the normalized sum of movement frequencies of the historical human region 1 is 0.6, i.e., is greater than ½, the historical human region 1 is removed from the historical human region list. In this way, a filtered historical human region list 1403 is finally obtained.

In STEP S146, the filtered historical human region list 1403 is output.

Here it should be noted that in the above description of filtering the human regions in the historical frame, only a case where the last frame is utilized is illustrated. However, it is possible to use the second frame, the third frame, . . . , the m-th frame backward from the current frame to replace the last frame. And it is possible to give a high weight to a frame close to the current frame; for example, the detection results of the last frame is considered more than the detection results of the second frame backward from the current frame.

Figure 8:
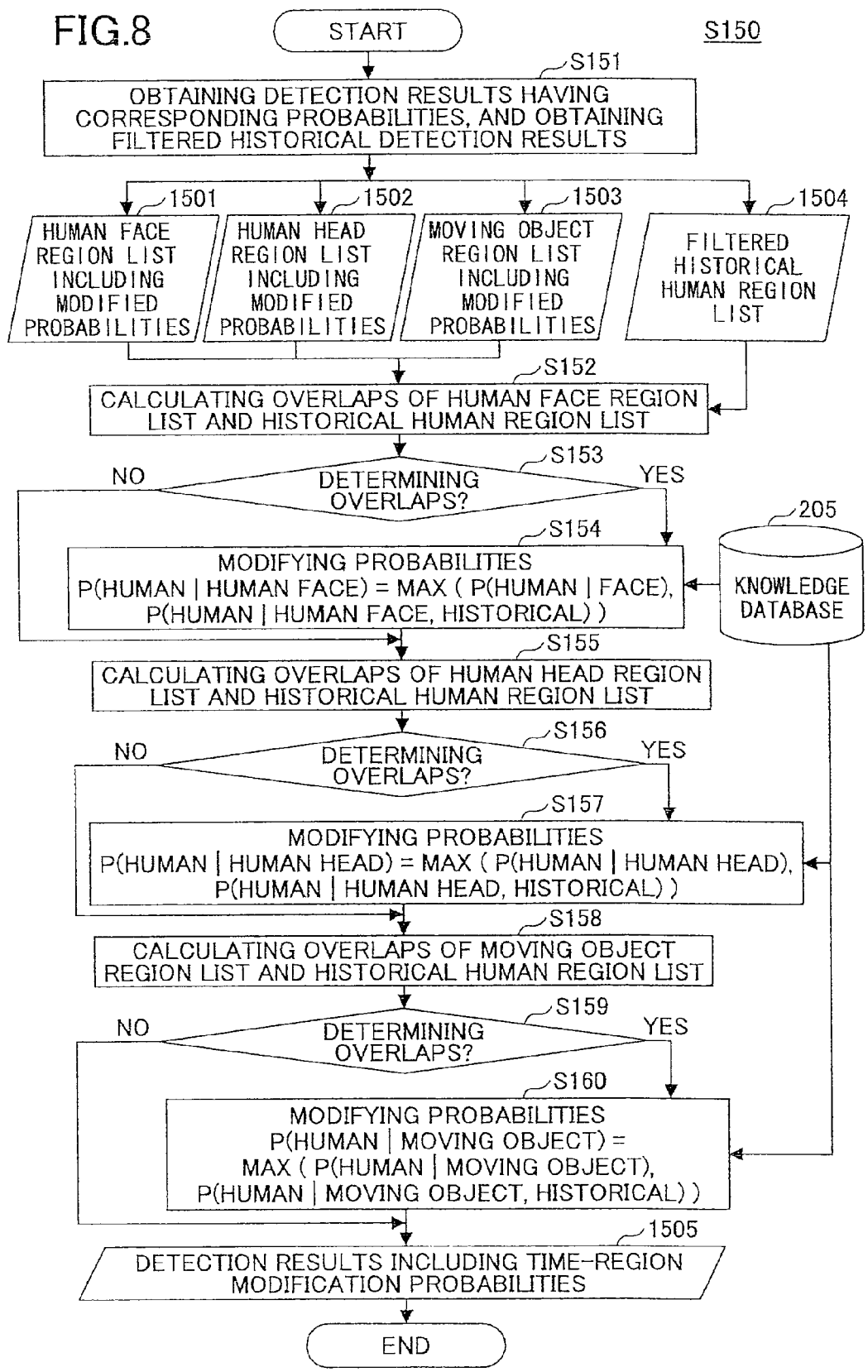
FIG. 8 is a flowchart of a method of modifying probabilities of plural kinds of detection results based on overlaps of the plural kinds of detection results in a space region and a historical human region list in a time region, according to an embodiment of the present invention.

In what follows, by reference to FIG. 8, the processing of time-region overlaps in STEP S150 of FIG. 1 is described by taking human detection as an example. FIG. 8 is a flowchart of a method of modifying probabilities of various detection results based on overlaps of the respective detection results in a space region and a historical human region list in a time region, according to an embodiment of the present invention.

First it should be noted that in FIG. 8, only overlaps of a historical human region list and detection results including moving object detection results, human face detection results, and human head detection results are described. In actual, the processing in the embodiments of the present invention is also suitable for other detection results related to humane detection. In FIG. 8, overlaps of the respective detection results and the historical detection result list in a time region are determined based on a predetermined threshold value, and then probabilities of the respective detection results are updated according to the overlaps in the time region.

In FIG. 8, different overlap types define overlaps of different space-region detection results and the time-region historical detection result list. For example, a case where human face detection results overlap with time-region historical regions (i.e. time-region historical detection results) is a kind of overlap type, and a case where human head detection results overlap with the time-region historical regions is another kind of overlap type. According to the overlap types, detection accuracies of time-space-region mixing detection methods corresponding to the overlap types are obtained from the knowledge database 205, and probabilities of the overlapped detection results are updated by using the accuracies. The time-space-region mixing detection methods refer to methods of obtaining human regions by combining detection results of detection methods (for example, a moving object detection method, a human face detection method, a human head detection method, or upper body detection method) of a current frame and a time-region historical detection results (i.e. time-region historical human regions).

In STEP S151, detection results of a current frame and their corresponding probabilities 1501, 1502, and 1503 as well as a time-region historical detection results (i.e. a time-region historical human region list) 1504 are obtained.

In STEP S152, overlaps of human face detection results and the time-region historical human region list are calculated. In STEP S153, it is determined whether there are the overlaps. If it is determined that there are the overlaps, then in STEP S154, probabilities of the overlapped human face detection results are modified. For example, a probability of an overlapped human face detection result may be modified by using the following equation (7).

$$P(\text{human}|\text{human face}) = \text{Max}(P(\text{human}|\text{human face}), P(\text{human}|\text{human face}, \text{historical})) \quad (7)$$

Here P(human|human face) refers to a probability of a current human face detection result; and P(human|human face, historical) refers to a detection accuracy of a time-space-region mixing detection method of a human face and a historical human, and may be obtained from the knowledge database 205.

In STEP S155, overlaps of human head detection results and the time-region historical human region list are calculated. In STEP S156, it is determined whether there are the overlaps. If it is determined that there are the overlaps, then in STEP S157, probabilities of the overlapped human head detection results are modified. For example, a probability of an overlapped human head detection result may be modified by using the following equation (8).

$$P(human|human\ head)=Max(P(human|human\ head), P(human|human\ head, historical)) \quad (8)$$

Here P(human|human head) refers to a probability of a current human head detection result; and P(human|human head, historical) refers to a detection accuracy of a time-space-region mixing detection method of a human head and a historical human, and may be obtained from the knowledge database 205.

In STEP S158, overlaps of moving object detection results and the time-region historical human region list are calculated. In STEP S159, it is determined whether there are the overlaps. If it is determined that there are the overlaps, then in STEP S160, probabilities of the overlapped moving object detection results are modified. For example, a probability of an overlapped moving object detection result may be modified by using the following equation (9).

$$P(human|moving\ object)=Max(P(human|moving\ object), P(human|moving\ object, historical)) \quad (9)$$

Here P(human|moving object) refers to a probability of a current moving object detection result; and P(human|head, historical) refers to a detection accuracy of a time-space-region mixing detection method of a moving object and a historical human, and may be obtained from the knowledge database 205.

According to the above described processing, detection results 1505 including time-region modification accuracies are obtained.

In addition, in a case of, for example, the overlaps of the time-space-region mixing detection results, the accuracy of the time-space-region mixing diction method obtained from the knowledge database is used to replace the probabilities of the respective detection results. However, it should be noted that the probabilities of the respective detection results may also be updated based on ratios of the overlapped areas. For example, if an overlapped area of a human face region and a historical human region is 70% of the area of the human face region, then it is possible to update the probability of the human face region by using the following equation: P(human|human face)*(1−70%)+P(human|human face, historical)*70%.

Furthermore, as for a case where the time-space-region mixing detection results do not overlap, the processing in FIG. 8 adopts a method of letting the probabilities be unchanged. However, in this case, it is also possible to adopt a penalty so as to reduce the probabilities of time-space-region mixing detection results.

Figure 9:
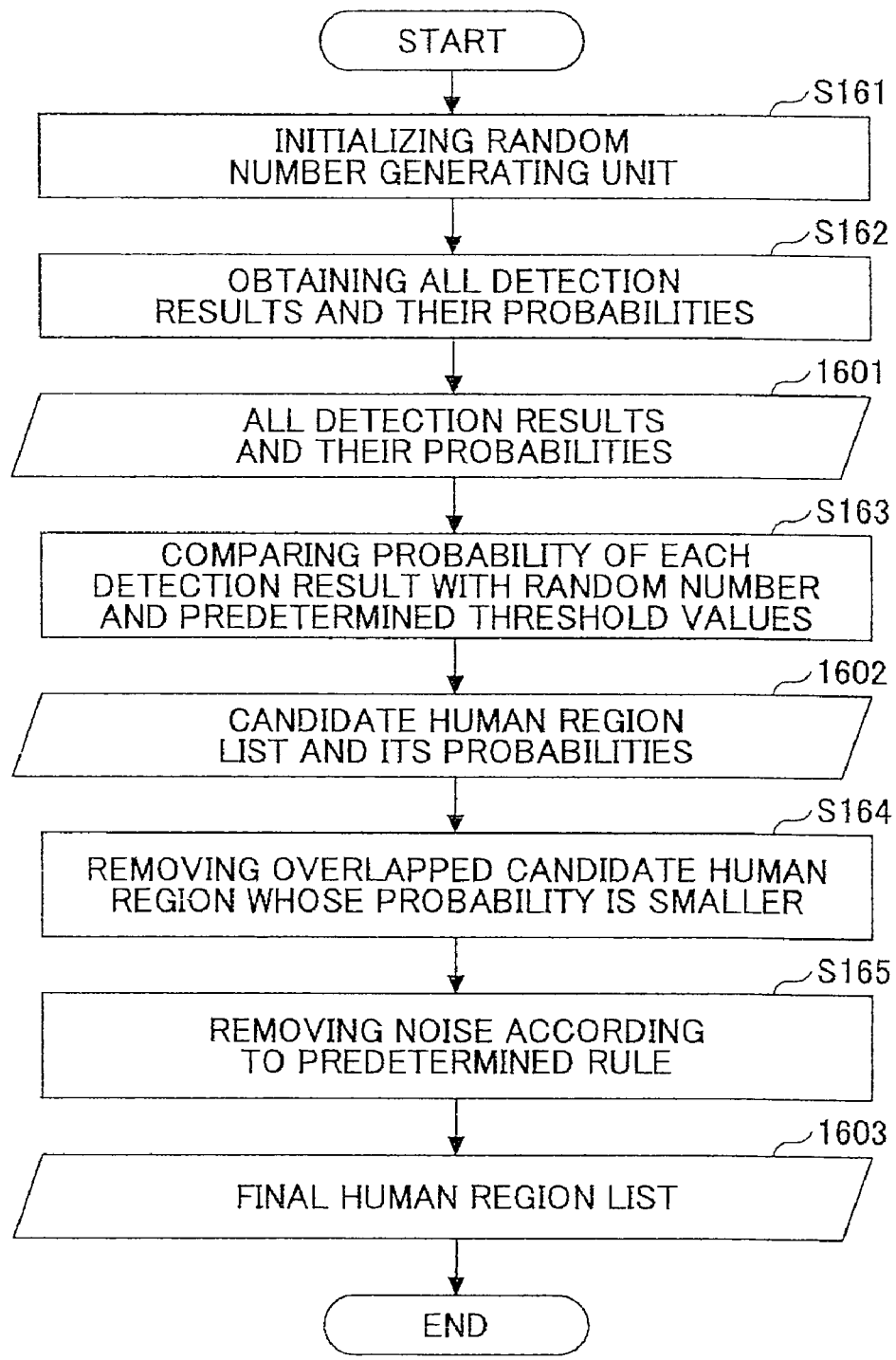
FIG. 9 is a flowchart of a method of determining a final human region list based on final probabilities of plural kinds of detection results and predetermined rules, according to an embodiment of the present invention.

In what follows, by reference to FIG. 9, the processing of determining a final list of detected objects based on the probabilities of the various detection results in STEP S160 of FIG. 1 is described. FIG. 9 is a flowchart of a method of determining a final human region list based on final probabilities of respective detection results, according to an embodiment of the present invention.

In STEP S161, a random number generating unit generates a random number in a range of 0 to 1. In STEP S162, respective detection results in plural kinds of detection results (for example, each of the plural kinds of detection results may be a list including plural detection results) and their corresponding probabilities 1601 are obtained. In STEP S163, a probability of each detection result in each of the plural kinds of detection results is compared with the random number, a predetermined first threshold value, and a predetermined second threshold value less than the predetermined first threshold value, for example, by using the following equation (10). If the probability of a detection result in one of the plural kinds of detection results is greater than the first threshold value, or is greater than the second threshold value and the random number, then the detection result remains; otherwise the detection result is removed. In this way, a candidate human list and its probabilities 1602 are obtained.

$$pass(i) = \begin{cases} 1, & p(i) > rand(t) \cap p(i) > Low\_threshold \\ 1, & p(i) \geq High\_threshold \\ 0, & p(i) \leq Low\_threshold \\ 0, & others \end{cases} \quad (10)$$

Here a range of the first threshold value High_threshold is, for example, 0.8 to 0.95, and a range of the second threshold value Low_threshold is, for example, 0 to 0.5. Concrete values of these two threshold values may be obtained from experiment or experience.

In this step, aside from the threshold values which are commonly used to filter the detection results, the random number is introduced too. As a result, the concept of probability may be reflected certainly.

In STEP S164, it is determined whether there is an overlap in the candidate human list; if there is, one of the overlapped two, having a lower probability is removed.

In STEP S165, the candidate human list is filtered again by utilizing predetermined rules so as to obtain a final human region list 1603. One of the predetermine rules is removing noise and defined according to an application. For example, in a video conference scene, a possibility of a person existing in the bottom area of a video frame is very low; as a result, it is possible to design a rule by which a detection result in the bottom area of a video frame may be removed. It should be noted that STEP S165 is a selectable step, not a necessary step.

In the above described embodiments, the object detection method is described by taking human detection as an example. However, it should be noted that the human detection is just an example; in other words, the present invention is not limited to the human detection. Other object detection, for example, cat detection or dog detection may also be applied to the embodiments of the present invention as long as the objection detection is able to be applied to the moving object detection method and the plural kinds of other detection methods. For example, as for the dog detection, similarly it is possible to employ the multi-mode detection method in the embodiments of the present invention according to moving object detection results and other detection results based on, for example, detection of the whole body of the dog, detection of the head of the dog, detection of the face of the dog, detection of the ears of the dog. Again, for example, as for car detection, similarly it is possible to employ the moving object detection method to obtain moving object results of moving cars, and it is also possible to obtain various kinds detection results based on, for example, detection of the whole bodies of cars or various parts of cars, such as wheels, lights, windows, etc.; in this way, it is possible to update probabilities of the respective kinds of detection results by taking into account overlaps of the respective kinds of detection results, and determine a final list of detected objects according the updated probabilities of the respective kinds of detection results.

Furthermore, in the above described embodiments, as for the other detection results aside from the moving object detection result, the detection results obtained by carrying out detection with regard to the human face and the human head serve as the other detection results; however, the present invention is not limited to these. In other words, it is possible to adopt different algorithms in a case where detection objects are the same to obtain detection results, and then apply the obtained detection results to the embodiments of the present invention. For example, as for a human face, it is possible to use a feature face algorithm, an AdaBoost algorithm, and a neural network algorithm to obtain respective kinds of human face detection results; in this way, it is possible to update probabilities of the respective kinds of human face detection results by taking into account, for example, overlaps of the respective kinds of human face detection results and historical human detection results, overlaps of the respective kinds of human face detection results themselves, and overlaps of the respective kinds of human face detection results and other detection results such as upper body detection results, and determine a final list of detected human faces according the updated probabilities of the respective kinds of human face detection results.

In the object detection method and the object detection device of the embodiments of the present invention, since the possibility of detection correctness is represented by the probabilities, and the probabilities are updated based on overlaps of the detection results of various detection methods, the object detection method and the object detection device have stronger flexibility, and more comprehensively take into account the time-region detection results and the space-region detection results; as a result, it is possible to improve the detection accuracy and reduce the detection error rate.

Figure 10:
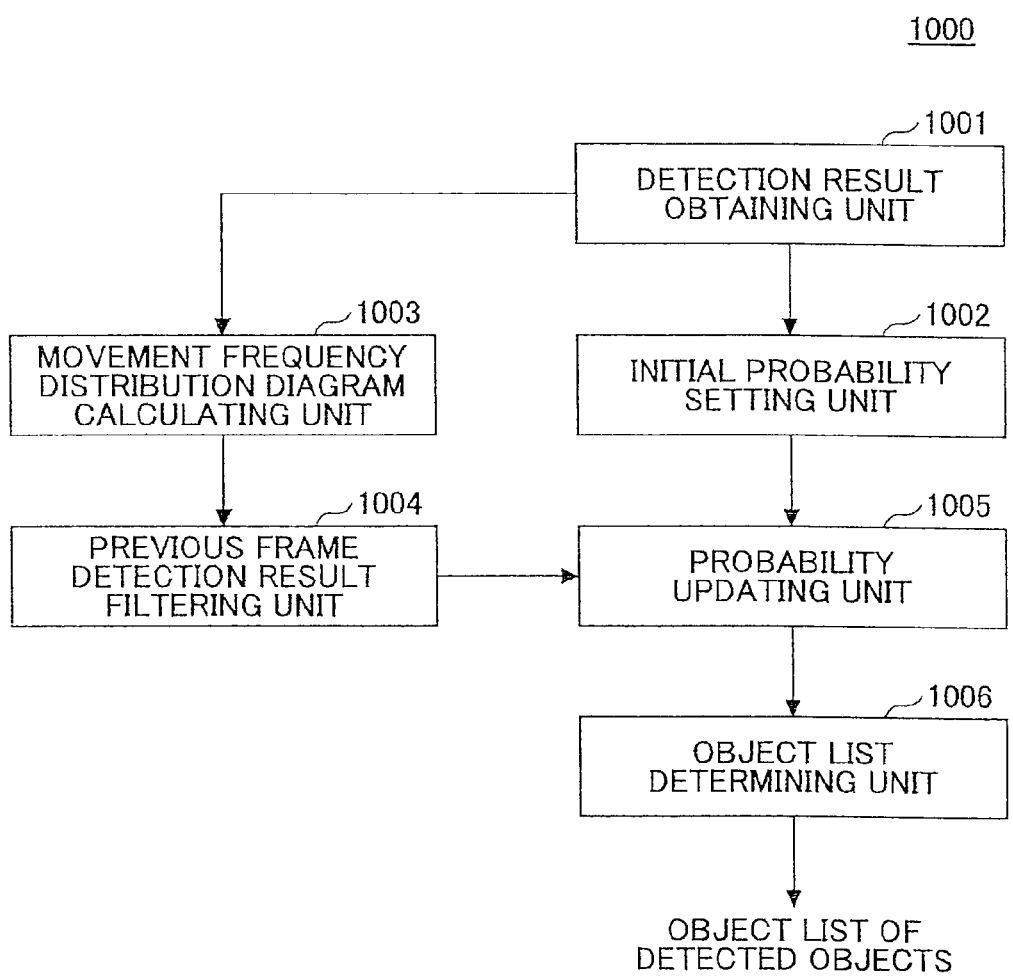
FIG. 10 is a block diagram of an object detection device according to an embodiment of the present invention.

FIG. 10 is a block diagram of an object detection device 1000 used to detect one or more predetermined specific objects in a video, according to an embodiment of the present invention.

The object detection device 1000 comprises a detection result obtaining unit 1001 used to obtain plural kinds of detection results by using plural object detection methods to detect the predetermined specific objects or parts of the predetermined specific objects in a current frame; an initial probability setting unit 1002 used to set initial probabilities of detection results corresponding to each of the plural kinds of detection results; a movement frequency calculating unit 1003 used to calculate, based on moving object detection results in plural frames including the current frame, a movement frequency distribution diagram representing movement frequencies of respective pixels in the current frame; a previous frame detection result filtering unit 1004 used to filter, based on the movement frequency distribution diagram, objects detected in a previous frame so as to obtain filtered previous frame detection results; a probability updating unit 1005 used to update, based on overlaps of the plural kinds of detection results and the filtered previous frame detection results, probabilities of the plural kinds of detection results; and an object list determining unit 1006 used to determine, based on the probabilities of the plural kinds of detection results, a final list of detected objects.

Figure 11:
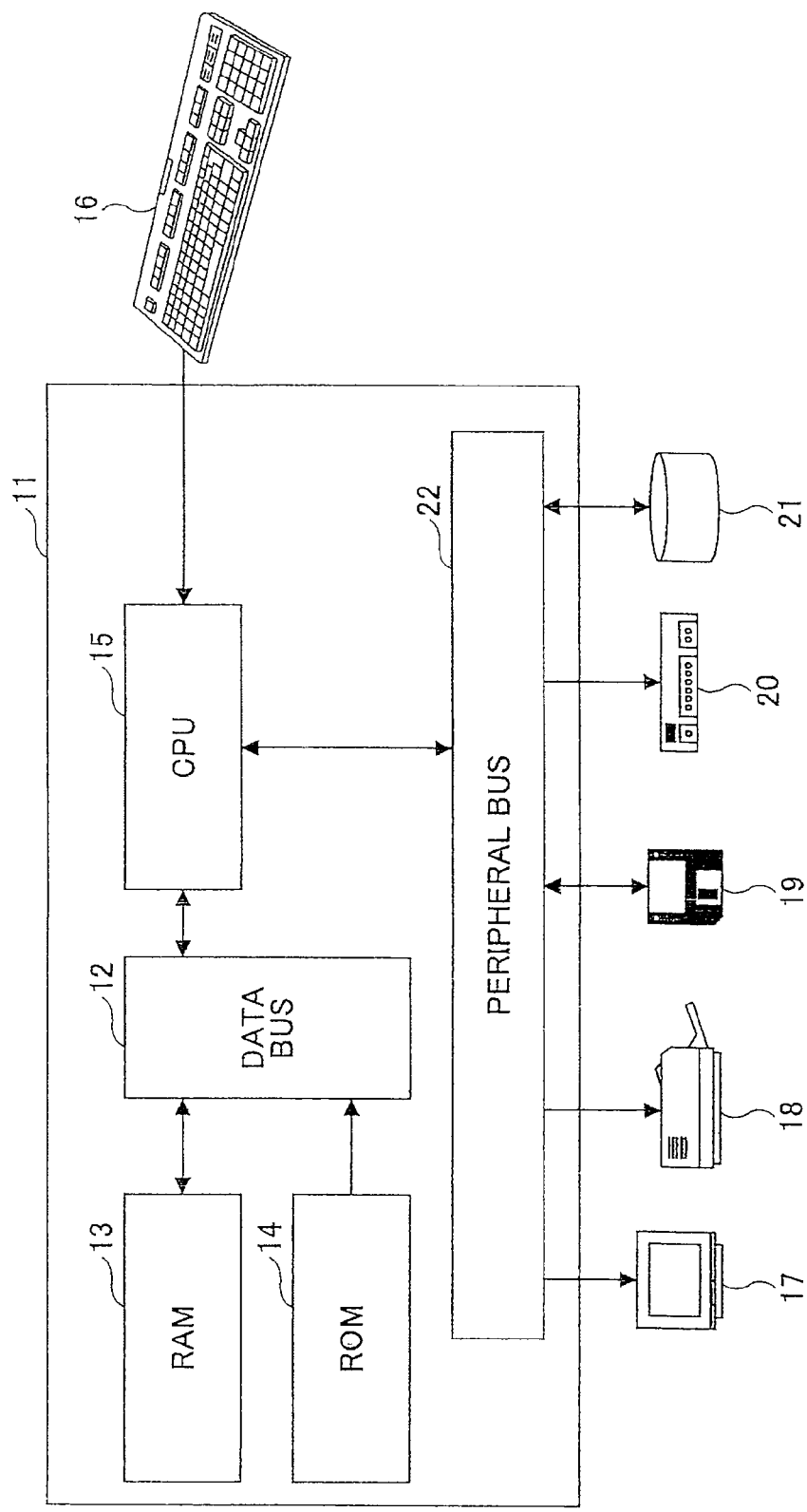
FIG. 11 illustrates a computer system according to an embodiment of the present invention.

FIG. 11 illustrates a computer system 10 according to an embodiment of the present invention.

As shown in FIG. 11, the computer system 10, by which the object detection method in the embodiments of the present invention may be realized, comprises a main body 11, a keyboard 16, a monitor 17, a printer 18, a floppy disk drive 19, a network access unit 20, and a hard disk drive 21. The main body 11 comprises a data bus 12, a random access memory (RAM) 12, a read-only memory (ROM) 14, a central processing unit (CPU) 15, and a peripheral bus 22.

According to instructions from the RAM 13, the CPU 15 controls receiving and processing of input data, and outputs results to the monitor 17 or other peripheral units. In this embodiment, one function of the CPU 15 is processing input images and video segments, performing plural kinds of detection methods, obtaining plural kinds of detection results, calculating a movement frequency distribution diagram, filtering previous frame detection results, updating probabilities of the plural kinds of detection results, and determining a final object detection list.

The CPU 15 accesses the RAM 13 and the ROM 14 via the data bus 12. The RAM 13 is used as a readable memory by the CPU 15 so as to serve as a working zone and a mutable data storage zone of various processes. The ROM 14 may store the images and the video segments waiting for processing, the plural kinds of detection results, the initial probabilities of the plural kinds of detection results, the updated probabilities, the historical frame detection results, the final object detection list, and other application programs.

The peripheral bus 22 is used for accessing peripheral devices such as input devices, output devices, storage devices, and the like, connected to the main body 11. In this embodiment, the peripheral devices include the monitor 17, the printer 18, the floppy disk drive 19, the network access unit 20, and the hard disk drive 21. The monitor 17 is used to display data and images output from the CPU 15 via the peripheral bus 22; it may be a grid display such as CRT or a LCD display. The printer 18 is used to print data and images output from the CPU 15 onto a paper or a medium like a paper. The floppy disk drive 19 and the hard disk drive 21 are used to store an input image, an video segment, object detection results, etc. By using the floppy disk drive 19, images may be used in various computers. The storage space of the hard disk drive 21 is larger, and its accessing speed is faster. Other storage devices such as flash memories, etc., may also store images for use of the computer system. The computer system may send or receive data to or from other computer systems via networks by using the network access unit 20. A user may input instructions to the computer system by using the keyboard 16.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010165233.9 filed on May 7, 2010, the entire contents of which are hereby incorporated by reference.

What is claimed is:

1. An object detection method of detecting one or more predetermined objects in a video, comprising:
   a step of obtaining plural kinds of detection results acquired by detecting the entireties or parts of the predetermined objects in a current frame according to plural kinds of object detection methods;

a step of setting, based on predetermined detection accuracies corresponding to the plural kinds of object detection methods, initial probabilities of the plural kinds of detection results of the current frame corresponding to the plural kinds of object detection methods;

a step of calculating, based on detection results of one or more moving objects in plural frames including the current frame, a movement frequency distribution diagram representing movement frequencies of respective pixels in the current frame;

a step of filtering objects detected in a previous frame of the current frame based on the movement frequency distribution diagram so as to obtain filtered detection results of the previous frame;

a step of updating, based on overlaps of the plural kinds of detection results of the current frame and the filtered detection results of the previous frame, the probabilities of the plural kinds of detection results of the current frame corresponding to the plural kinds of object detection methods; and a step of determining a final list of detected objects based on the updated probabilities of the plural kinds of detection results of the current frame.

2. The object detection method according to claim 1, further comprising:

a step of updating the probabilities of the plural kinds of detection results of the current frame based on overlaps of the plural kinds of detection results themselves of the current frame.

3. The object detection method according to claim 2, wherein:

the step, of updating the probabilities of the plural kinds of detection results of the current frame based on overlaps of the plural kinds of detection results of the current frame, includes:

a step of determining whether a predetermined number of detection results overlap by comparing an overlap ratio of regions corresponding to the predetermined number of detection results with a predetermined threshold value, wherein, if the predetermined number of detection results overlap, then a probability of each of the predetermined number of detection results is updated based on a predetermined detection accuracy corresponding to the overlap of the predetermined number of detection results.

4. The object detection method according to claim 1, further comprising:

a step of removing at least one object causing noise in the plural kinds of detection results of the current frame or the final list of detected objects based on a noise removing rule defined according to an application.

5. The object detection method according to claim 1, wherein: the predetermined detection accuracies corresponding to the plural detection methods, predetermined detection accuracies corresponding to overlaps of the plural detection results of the plural detection methods and the detection results of the previous frame are stored in a knowledge database in advance, and the knowledge database is obtained by statistics calculation.

6. The object detection method according to claim 1, wherein:

the step of calculating, based on detection results of one or more moving objects in plural frames including the current frame, a movement frequency distribution diagram representing movement frequencies of respective pixels in the current frame includes:

a step of calculating, based on the detection results of the moving objects in the plural frames, the number of times of the respective pixels belonging to the moving objects in a predetermined continuous time period until a current time point, and then obtaining the movement frequency distribution diagram by dividing the number of times of the respective pixels belonging to the moving objects by the number of the plural frames.

7. The object detection method according to claim 6, wherein:

the step, of filtering objects detected in a previous frame of the current frame based on the movement frequency distribution diagram so as to obtain filtered detection results of the previous frame, includes:

a step of calculating the sum of movement frequencies of a region of an object detected in the previous frame;

a step of normalizing the sum of movement frequencies of the region of the object; and a step of retaining the object if the normalized sum is less than or equal to a predetermined threshold value, otherwise removing the object from the objects detected from the previous frame.

8. The object detection method according to claim 1, wherein:

the step of updating, based on overlaps of the plural kinds of detection results of the current frame and the filtered detection results of the previous frame, the probabilities of the plural kinds of detection results of the current frame corresponding to the plural kinds of object detection methods includes:

a step of determining whether there are overlaps between respective detection results of a kind of detection result and the filtered detection results of the previous frame, wherein, if overlaps exist, then the probabilities of the respective detection results of this kind of detection result is updated based on a predetermined detection accuracy corresponding to the overlap.

9. The object detection method according to claim 1, wherein:

the step, of determining a final list of detected objects based on the updated probabilities of the plural kinds of detection results of the current frame, includes:

a step of generating a random number in a range of 0 to 1 by a random number generating unit;

a step of comparing the probability of each detection result of the plural kinds of detection results with the random number, a predetermined first threshold value, and a predetermined second threshold value less than the predetermined first threshold value; and a step of retaining the detection result if the probability of the detection result is greater than the predetermined first threshold value, or is greater than the second threshold value and the random number, otherwise removing the detection result.

10. An object detection device for detecting one or more predetermined objects in a video, comprising:

a detection result obtaining device for obtaining plural kinds of detection results acquired by detecting the entireties or parts of the predetermined objects in a current frame according to plural kinds of object detection methods;

an initial probability setting device for setting, based on predetermined detection accuracies corresponding to the plural kinds of object detection methods, initial probabilities of the plural kinds of detection results of the current frame corresponding to the plural kinds of object detection methods;

a movement frequency distribution diagram calculating device for calculating, based on detection results of one or more moving objects in plural frames including the current frame, a movement frequency distribution diagram representing movement frequencies of respective pixels in the current frame;

a previous detection result filtering device for filtering objects detected in a previous frame of the current frame based on the movement frequency distribution diagram so as to obtain filtered detection results of the previous frame;

a probability updating device for updating, based on overlaps of the plural kinds of detection results of the current frame and the filtered detection results of the previous frame, the probabilities of the plural kinds of detection results of the current frame corresponding to the plural kinds of object detection methods; and an object list determining device for determining a final list of detected objects based on the updated probabilities of the plural kinds of detection results of the current frame.

11. A non-transitory computer-readable medium having machine-executable instructions for execution by a processing system, wherein, the machine-executable instructions are used for carrying out an object detection method of detecting one or more predetermined objects in a video, and the machine-executable instructions, when executed, cause the processing system to carry out:

a step of obtaining plural kinds of detection results acquired by detecting the entireties or parts of the predetermined objects in a current frame according to plural kinds of object detection methods;

a step of setting, based on predetermined detection accuracies corresponding to the plural kinds of object detection methods, initial probabilities of the plural kinds of detection results of the current frame corresponding to the plural kinds of object detection methods;

a step of calculating, based on detection results of one or more moving objects in plural frames including the current frame, a movement frequency distribution diagram representing movement frequencies of respective pixels in the current frame;

a step of filtering objects detected in a previous frame of the current frame based on the movement frequency distribution diagram so as to obtain filtered detection results of the previous frame;

a step of updating, based on overlaps of the plural kinds of detection results of the current frame and the filtered detection results of the previous frame, the probabilities of the plural kinds of detection results of the current frame corresponding to the plural kinds of object detection methods; and a step of determining a final list of detected objects based on the updated probabilities of the plural kinds of detection results of the current frame.

* * * * *